July 30, 1963
A. J. KAYSER
3,099,496
PUMP FOR IMPARTING MOVEMENT TO DRY PULVERULENT MATERIAL
Filed Jan. 22, 1962
2 Sheets-Sheet 1
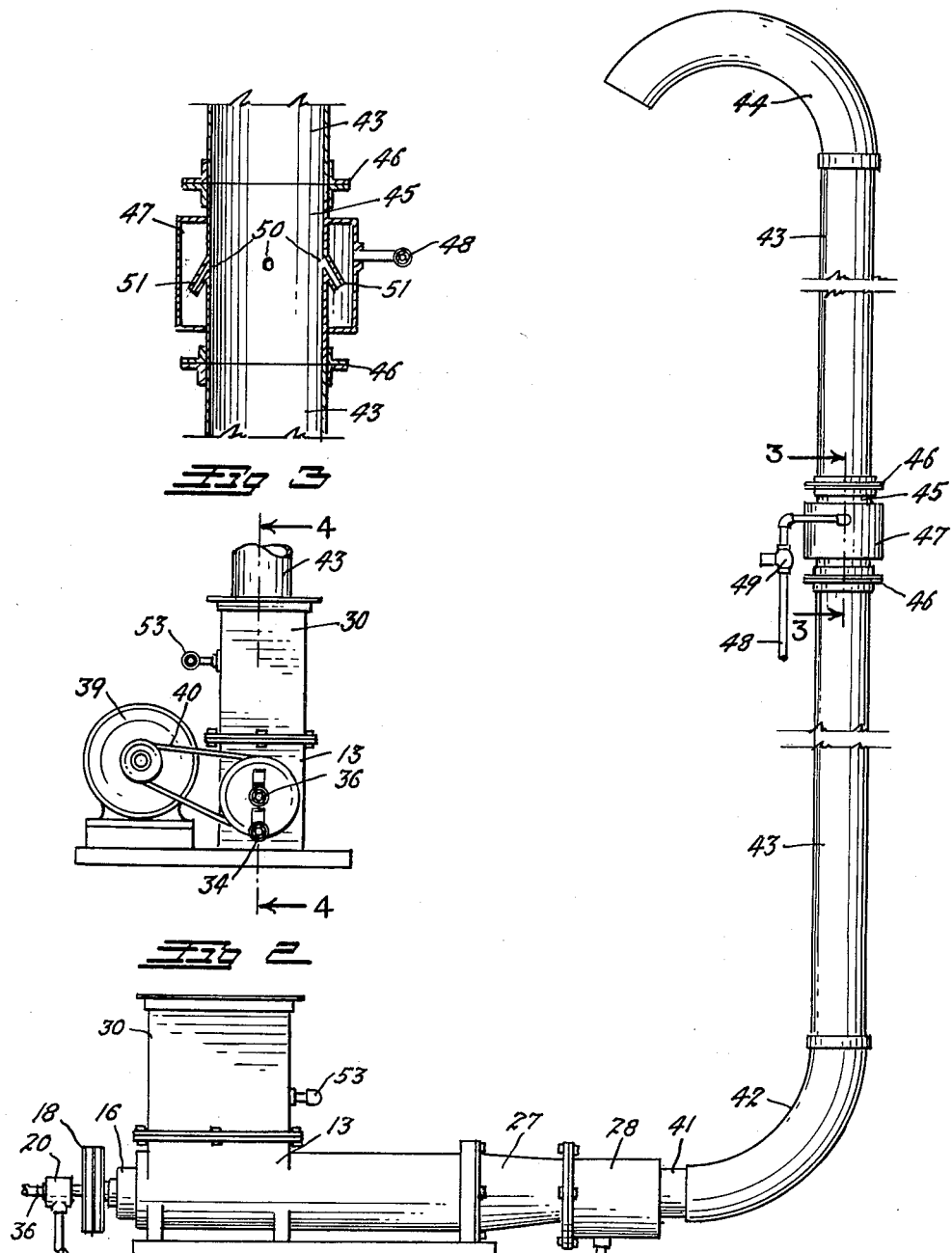
INVENTOR.
ALLAN J. KAYSER
BY
ATTORNEY

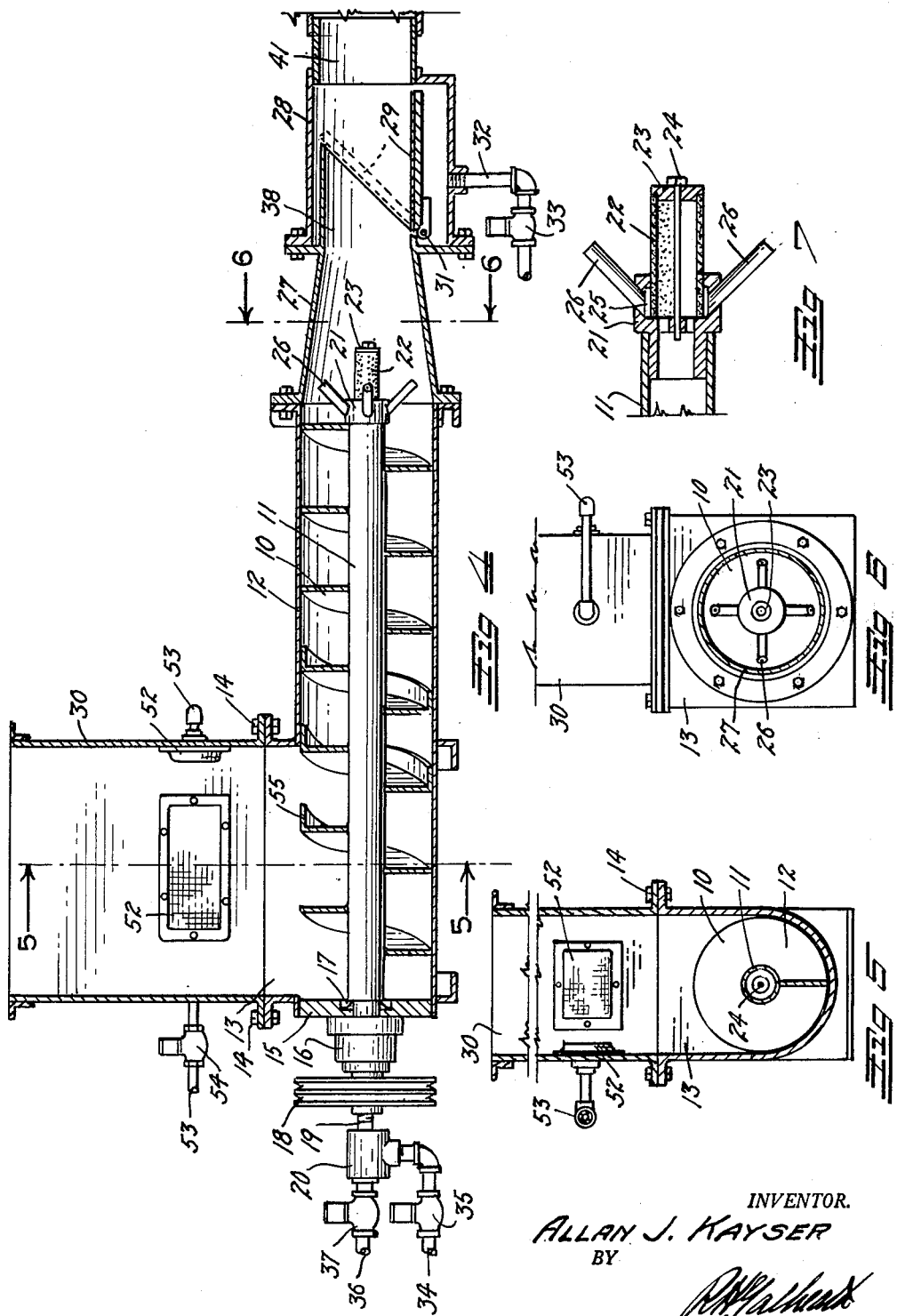

United States Patent Office 3,099,496
Patented July 30, 1963

3,099,496
PUMP FOR IMPARTING MOVEMENT TO DRY
PULVERULENT MATERIAL
Allan J. Kayser, 712 S. Gilpin St., Denver 9, Colo.
Filed Jan. 22, 1962, Ser. No. 167,745
3 Claims. (Cl. 302—50)

This invention relates to an impelling device for elevating bulk, dry cement into batch plants, concrete mixing devices and the like.

The forcing of dry concrete cement through conduits has presented quite a problem to the construction industry. The cement is in the condition of an impalpable powder which quickly settles and packs into a relatively rigid mass. Attempts have been made to force the cement through a conduit by means of scroll conveyor screws. The result is to increase the packing characteristics of the cement to such an extent that the screw becomes clogged and immovable. Attempts have been made to blow the cement through a conduit by a low pressure high volume air blast. This was found to require an air blast of impractical proportions and also created a dust problem that made it difficult to recover the cement from the discharging air stream. Other attempts have been made to force the cement through a conduit with high pressure air. These have not been found to be satisfactory since the air would blow back and channel through the cement with very little movement of the latter.

The principal object of this invention is to provide a dry cement impelling mechanism in which relatively high pressure, low volume air will be introduced below the cement and in which the latter will be constantly maintained in a light, fluffy, easily handled, controlled, aerated, fluid condition at all times, and to provide a rapidly rotating scroll conveyor screw which will serve to supply the cement to the air at relatively high velocity and which will also act to prevent blow back of the air through the cement feed so that a relatively high pneumatic pressure can be maintained on the fluidized cement to effectively force it forwardly without channeling.

Another objection to present devices of this character is that if allowed to stand for an interval with cement in place therein, the cement will pack and in damp atmospheres will become permanently set to completely lock the impelling machine.

Another object of this invention is to provide means in a machine of this character for instantly and completely cleaning the impelling mechanism and the cement conveying conduits whenever the machine is stopped so that it can be restarted without difficulty after every stoppage interval.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a side view of the improved dry cement impelling device as it would appear when in use for elevating the cement;

FIG. 2 is an end elevational view thereof looking toward the left end of FIG. 1;

FIG. 3 is an enlarged fragmentary detail section taken on the line 3—3, FIG. 1;

FIG. 4 is a similarly enlarged longitudinal section taken on the line 4—4, FIG. 2;

FIG. 5 is a cross-section taken on the line 5—5, FIG. 4, partially broken away;

FIG. 6 is a similar cross-section taken on the line 6—6, FIG. 4; and

FIG. 7 is a still further enlarged, longitudinal, detail section taken on the line 7—7, FIG. 4.

This invention employs a scroll conveyor screw 10 mounted on a hollow shaft 11 within a conveyor cylinder 12. An open feed box 13 is formed on and opens to the rear extremity of the conveyor cylinder 12 and a rectangular feed hopper 30 is mounted on the box 13 in any suitable manner such as by means of bolts 14.

The rear extremity of the cylinder 12 is closed by an end plate 15 upon which an elongated outboard bearing 16 is mounted for rotatably supporting the tubular conveyor shaft 11. The end plate 15 is counterbored about the shaft 11 to receive an annular resilient dust seal 17.

The shaft 11 protrudes rearwardly from the end plate and a drive sheave 18 is mounted on this protruding extremity. The sheave is driven from a motor 39 through the medium of a transmission belt or chain 40 to impart rotation to the shaft 11.

An air nipple 19 is threaded into and protrudes rearwardly from the rear extremity of the shaft into a swivel air gland 20 for supplying air to the hollow interior of the shaft as the latter rotates. Operating air is furnished to the swivel fitting 20 through an operating air pipe 34 controlled by a first solenoid valve 35 and additional air can be admitted to the fitting 20, as will be later described, through a high pressure pipe 36 controlled by a second solenoid valve 37.

A nozzle plug 21 is fixedly mounted in the forward extremity of the tubular shaft. A tubular, porous air dispersing tube 22 is concentrically mounted in the plug 21. The porous tube is closed at its forward extremity by means of a cap 23 clamped in place by means of an axially positioned clamp screw 24 threaded into the plug 21. The tube 22 is preferably formed of cintered bronze which provides a highly porous medium of great dispersion qualities.

An annular air cavity 25 is formed in the plug about the porous tube 22 and a plurality of equally spaced, tubular jet members 26 are threaded into the plug at an angle of substantially 45° to the axis of the latter so as to rotatably direct air forwardly and outwardly therefrom as the shaft rotates.

A conical tubular reducer 27 is mounted on the forward extremity of the conveyor cylinder 12 to gradually reduce the internal diameter of the flow forwardly from the cylinder 12. A check valve housing 28, provided with a material discharge sleeve 41, is mounted upon the forward extremity of the reducer 27. The forward extremity of the reducer 27 extends into the housing, as shown at 38, and terminates on a rearwardly and downwardly inclined terminal surface. A flap valve 29 is pivoted at the bottom of the cut back extremity of the reducer 27, as shown at 31, and normally lies in a substantially horizontal position in the bottom of the housing 28 so as not to interfere with the normal flow of material therethrough. The flap valve 29 can be forced upwardly to close the inclined terminal extremity 38 of the reducer portion 27 by admitting air to the bottom of the housing 28 through a cleanout pipe 32 controlled by a third solenoid valve 33.

The invention is designed for impelling dry material such as Portland cement through a conduit connected to the discharge sleeve 41 of the check valve housing. It is more particularly designed for elevating dry, powdered, bulk cement. For the latter use, a relatively large radius elbow 42 is connected to the discharge sleeve 41 to convey the cement into a riser pipe 43 of any required height and terminating at its top in a discharge spout 44.

For lifting cement to a height of 30 or 40 feet no additional equipment is required. For greater heights, the riser pipe 43 may be provided at suitable intervals with aerating sections, as illustrated in FIG. 3.

Each aerating section comprises a tubular air coupling 45 corresponding in diameter to the riser pipe 43 and provided at its extremities with suitable connecting means 46 for connecting it between sections of the riser pipe 43. An annular air envelope 47 surrounds the coupling 45 to which air is supplied from a vertical riser air pipe 48 controlled by a fourth solenoid valve 49. The wall of the air coupling portion 45 is provided with a plurality of circumferentially spaced air ports 50 to each of which air is directed at an upward angle by means of an air directing tube 51 receiving air from the air envelope 47 and directing it inwardly and upwardly through the air port 50.

The walls of the hopper 30 are provided with porous air pads 52 to which air may be admitted from a hopper-air pipe 53 controlled in any suitable manner such as through the medium of a 5th solenoid valve 54.

In actual use the operating air pipe, the cleanout pipe 32 and the riser air pipe 48 are connected to an air source supplying from 40 to 60 cu. ft. per minute at 40 p.s.i. The high pressure pipe is connected to source of higher pressure capable of supplying 60 cubic ft. per minute at 60 p.s.i. and the hopper air pipe 53 is connected to a relatively low volume, low pressure source of approximately 10 p.s.i. The motor 39 and the transmission 40 are such as will rotate the hollow shaft 11 at approximately 800 r.p.m.

Cement is dumped into the hopper 30 from the supply trucks or bins. The dumped loads vary in density. Some will be rather tightly compacted. The air entering the hopper through the porous pads 52 will aerate the compacted loads so that all will flow freely to the conveyor screw 10 without arching or compacting. The rapidly rotating screw forces the cement forwardly in the cylinder 12 at approximately 400 ft. per minute into the reducer portion 27. The rotating blasts from the jet members 26 break up the rapidly moving cement column into a granular consistency and the thousands of small jets from the porous tube 22 break up the granules into a microscopic dispersion of air and cement.

The pressure in the reducer portion 27 due to the introduced air pressure, the pumping effect of the conveyor screw 10 and the resistance in the elbow 42 and user pipe 43, will reach 50 p.s.i. as opposed to zero pressure in the hopper 30. Blow back is prevented, however, by the relatively tight filling conveyor screw and the tightly packed rapid forward travel of the cement. The screw is of rather short pitch and operates at exceedingly high speed compared to conventional screw conveyors. The turns of the conveyor screw at the point of exit from the hopper are also provided with a peripheral flange or shroud 55 which prevents the packed cement from being blown back over the screw. Thus, the screw functions as a perfect reverse-flow seal at the intake extremity of the system.

Thus we have a high pressure mass (40 to 80 p.s.i.) of intermixed cement and air compacted by the reducer portion 27 with only one place to go, that is, through the check valve housing 28, the elbow 42 and upwardly in the riser pipe 43 from which it discharges in a steady stream.

In exceedingly long riser pipes the pipe friction may lend to slow the rising mixture of air and cement and in such cases the air envelopes 47 would be installed to maintain the pressure in the riser pipe.

The electric current for the motor 39 and the solenoid valves 35, 37, 33 and 54 is controlled by conventional timing and program switches so that they will operate in proper sequence and at proper times to accomplish the desired results. For instance, the circuits may be connected so that initially the solenoid valves 35 and 54 will open to start aeration. Shortly thereafter, the circuit to the motor will be closed to start the conveyor screw 10 and cement will be fed into the hopper 30.

Should the load on the motor 39 increase for any reason above a pre-determined amount a conventional overload relay will be actuated to energize the solenoid valve 37 to admit the higher pressure air to the porous tube 22 and the jet members 26 to increase the proportion of air and lighten the weight of the air-cement mixture. This will also increase the pressure in the reducer portion 27 to force the mixture forwardly so as to quickly relieve the load on the conveyor screw 10 and the motor, after which, the solenoid valve closes and normal operation is resumed.

It is not desirable to leave cement in the conveyor cylinder 12 or the user pipe 43 when closing down the plant. The latter cement would become packed and in damp atmosphere would become set so as to prevent restarting of the plant. The electrical connections are such that when the motor is shut off the high pressure valve 37 will open temporarily to blow cement forwardly from the reducer portion 27. It will then close and the cleanout valve 33 will open to force the flap valve 29 closed to place air pressure from the cleanout pipe 32 beneath column in the riser pipe 43 to blow the latter clean, after which, the cleanout valve 33 will close and the device will remain at rest ready for use.

The primary advantage attained by the effective seal at the screw conveyor is that a much higher pressure can be used than in conventional pneumatic conveying systems. By using high pressure, very high resistance can be overcome, so instead of pumping air with a little cement in it, cement is pumped with little air in it. Low pressure pneumatic systems use a ratio of possibly 2–3 lbs. of material per cubic foot of air whereas this device uses about 20 or 25 pounds of material per cubic foot of air.

The primary advantage of the high pressure is that relatively low line velocities can be used as velocity is not required to suspend the material. It takes energy to raise the velocity of the conveyed material from zero to transport velocity. On extensive systems, this energy is not too significant whereas on short runs such as this device is designed for, this energy becomes the dominant factor so that the high pressure with low velocity becomes advantageous from the power requirement angle. The other advantage of primary concern is the lack of dust with high pressure which is due to the low ratio of air to cement.

While a specific form of the improvement has been described and illustrated herein, it is to be understood that the same may be varied within the scope of the appended claims, without departing from the spirit of the invention.

Having thus described the invention what is claimed and desired to be secured by Letters Patent is:

1. A pump for imparting movement to dry pulverulent material comprising:

(a) A horizontally elongated conveyor screw cylinder having an open discharge extremity and a closed intake extremity, said cylinder being provided with an intake opening in its top adjacent said intake extremity for receiving said pulverulent material;

(b) A conveyor screw mounted on a tubular shaft rotatably journalled in the intake extremity of said cylinder and extending throughout the length of the latter for conveying material longitudinally of said cylinder and discharging same at the open discharge extremity;

(c) Means for introducing air under pressure into the intake extremity of said shaft, said air discharging at the discharge extremity of said cylinder;

(d) A tubular reducer portion mounted on said discharge extremity, said portion gradually decreasing in diameter toward said discharge extremity to apply a compressive bias to the material discharging from said extremity;

(e) A feed hopper mounted on said cylinder over said intake opening for directing material through the latter;

(f) A porous-walled tube mounted on the discharge extremity for receiving the air discharging from said tubular shaft and distributing said air through the discharging pulverulent material; and (g) Forwardly and outwardly directed jet tubes mounted on the discharge extremity of said shaft and rotatable with the latter to discharge air about the peripheral portions of the stream of discharging pulverulent material.

2. A pump for imparting movement to dry pulverulent material comprising:

(a) A horizontally elongated conveyor screw having an open discharge extremity and a closed intake extremity, said cylinder being provided with an intake opening in its top adjacent said intake extremity for receiving said pulverulent material;

(b) A conveyor screw mounted on a tubular shaft rotatably juornalled in the intake extremity of said cylinder and extending throughout the length of the latter for conveying material longitudinally of said cylinder and discharging same at the open discharge extremity;

(c) Means for introducing air under pressure into the intake extremity of said shaft, said air discharging at the discharge extremity of said cylinder;

(d) A tubular reducer portion mounted on said discharge extremity, said portion gradually decreasing in diameter toward said discharge extremity to apply a compressive bias to the material discharging from said extremity;

(e) A second means for discharging air into said shaft at a higher pressure than said first means;

(f) A motor for driving said conveyor screw; and (g) Electrical means connected in the circuit of said motor which when the load on said motor exceeds a predetermined maximum will initiate the flow of air through said second means.

3. A pump for imparting movement to dry pulverulent material comprising:

(a) A horizontally elongated conveyor screw cylinder having an open discharge extremity and a closed intake extremity, said cylinder being provided with an intake opening in its top adjacent said intake extremity for receiving said pulverulent material;

(b) A conveyor screw mounted on a tublar shaft rotatably journalled in the intake extremity of said cylinder and extending throughout the length of the latter for conveying material longitudinally of said cylinder and discharging same at the open discharge extremity;

(c) Means for introducing air under pressure into the intake extremity of said shaft, said air discharging at the discharge extremity of said cylinder;

(d) A tubular reducer portion mounted on said discharge extremity, said portion gradually decreasing in diameter toward said discharge extremity to apply a compressive bias to the material discharging from said extremity;

(e) A feed hopper mounted on said cylinder over said intake opening for directing material through the latter;

(f) A porous-walled tube mounted on the discharge extremity for receiving the air discharging from said tubular shaft and distributing said air through the discharging pulverulent material;

(g) An upwardly turned elbow receiving the discharging material and directing the latter upwardly;

(h) A vertical riser pipe receiving the upwardly directed material from said elbow;

(i) Receiving means on the upper extremity of said riser pipe;

(j) A flap valve housing interposed in the flow of material from said cylinder and said elbow;

(k) A flap valve swingably mounted in said latter housing so as to swing into the line of flow of said material to prevent the latter from returning to said cylinder; and (l) Means for introducing compressed air into said housing forwardly of said flap valve to force the latter rearwardly to a closed position; and (m) Means for initiating the flow of air through (l) in consequence of the stoppage of said feed screw.

References Cited in the file of this patent
UNITED STATES PATENTS

| | | |
|---|---|---|
| 560,381 | Wainwright | May 19, 1896 |
| 2,355,774 | Baker | Aug. 15, 1944 |
| 2,851,310 | Best | Sept. 9, 1958 |
| 3,004,799 | Tikal | Oct. 17, 1961 |